United States Patent
Martinet et al.

(10) Patent No.: US 8,597,828 B2
(45) Date of Patent: Dec. 3, 2013

(54) LITHIUM BATTERY USING AN AQUEOUS ELECTROLYTE

(75) Inventors: Sébastien Martinet, Grenoble (FR); Hélène Lignier, Saint Laurent du Pont (FR)

(73) Assignee: Commissariat a l'Energie Atomique, Paris (FR)

( * ) Notice: Subject to any disclaimer, the term of this patent is extended or adjusted under 35 U.S.C. 154(b) by 905 days.

(21) Appl. No.: 12/194,715

(22) Filed: Aug. 20, 2008

(65) Prior Publication Data
US 2009/0087742 A1 Apr. 2, 2009

(30) Foreign Application Priority Data

Aug. 24, 2007 (FR) ...................... 07 57169

(51) Int. Cl.
*H01M 6/18* (2006.01)
*H01M 4/13* (2010.01)
*H01M 10/26* (2006.01)
*H01M 6/04* (2006.01)

(52) U.S. Cl.
USPC .... 429/207; 429/322; 429/231.95; 429/231.5

(58) Field of Classification Search
USPC .......................... 429/207, 322, 231.95, 231.5
See application file for complete search history.

(56) References Cited

U.S. PATENT DOCUMENTS

| | | | | |
|---|---|---|---|---|
| 3,976,509 A | * | 8/1976 | Tsai et al. | 429/341 |
| 5,733,681 A | * | 3/1998 | Li et al. | 429/332 |
| 6,358,651 B1 | * | 3/2002 | Chen et al. | 429/303 |
| 7,282,295 B2 | * | 10/2007 | Visco et al. | 429/126 |

OTHER PUBLICATIONS

French Search Report dated Apr. 1, 2008, in corresponding French Patent Application No. 07 57169, filed Aug. 24, 2007.
Manickam, Minakshi, et al., "Redox behavior and surface characterization of $LiFePO_4$ in lithium hydroxide electrolyte", Journal of Power Sources, 2006, p. 646-649, vol. 158.
Wang, G.J., et al., "Aqueous rechargeable lithium battery (ARLB) based on $LiV_3O_8$ and $LiMn_2O_4$ with good cycling performance", Electrochemistry Communications, 2007, p. 1873-1876, vol. 9.
Wang, G.J., et al., "Characteristics of an aqueous rechargeable lithium battery (ARLB)", Electrochimica Acta, 2007, p. 4911-4915, vol. 52.
Wang, Haibo, et al., "Improvement of cycle performance of lithium ion cell $LiMn_2O_4/Li_xV_2O_5$ with aqueous solution electrolyte by polypyrrole coating on anode", Electrochimica Acta, 2007, p. 5102-5107, vol. 52.
Wang, G.X., et al., "Secondary aqueous lithium-ion batteries with spinel anodes and cathodes", Journal of Power Sources, 1998, p. 198-201, vol. 74.

* cited by examiner

*Primary Examiner* — Helen O Conley
(74) *Attorney, Agent, or Firm* — Brinks Gilson and Lione

(57) ABSTRACT

The invention relates to a lithium battery including a cell comprising:
a positive electrode,
a negative electrode, and
an electrolyte consisting of an aqueous solution of a lithium salt,
characterized in that the electrolyte has a pH of at least 14, the positive electrode has a lithium intercalation potential greater than 3.4 V, and the negative electrode has a lithium intercalation potential less than 2.2 V.

8 Claims, 1 Drawing Sheet

LITHIUM BATTERY USING AN AQUEOUS ELECTROLYTE

TECHNICAL FIELD

The present invention relates to a lithium battery comprising an aqueous electrolyte based on lithium ions.

The batteries of the invention therefore avoid severe constraints concerning the use of organic electrolytes and significantly enhance power performance.

These batteries find their application in many fields, in particular supplying power to thin embedded systems, such as credit cards and intelligent labels, to mobile telephones and to electric vehicles.

PRIOR ART

Lithium batteries operate on the principle of simultaneous insertion/de-insertion (or intercalation/de-intercalation) of lithium in their positive and negative electrodes.

To be more precise, the electrochemical reaction producing current employs the transfer, via an electrolyte that conducts lithium ions, of lithium cations from a negative electrode that are intercalated into an acceptor array of a positive electrode, the lithium ions passing in transit through the electrolyte conducting lithium ions.

The negative electrode is generally based on a carbon material such as graphite and is the seat of a lithium intercalation reaction during charging.

The positive electrode is based on a transition metal oxide containing lithium (the metal can be cobalt, nickel or manganese, for example) and is the seat of a lithium de-intercalation reaction during charging.

A separator provides physical separation between the negative electrode and the positive electrode. It conventionally includes a microporous film, for example of polyolefin, such as polyethylene or polypropylene, with a thickness that can range from 20 to 25 µm, and which is impregnated with a liquid electrolyte.

The liquid electrolyte must conduct the lithium ions from the positive electrode to the negative electrode during charging and vice-versa during discharging (i.e. in operation). This electrolyte conventionally takes the form of a lithium salt dissolved in an organic solvent, generally of the carbonate family.

This type of electrolyte is highly sensitive to water. Rechargeable batteries comprising them must therefore be assembled under closely controlled conditions, with tight control of the ambient relative humidity, conventionally under white room conditions.

What is more, electrolytes based on an organic solvent have a very limited conductivity (of the order of $10^{-2}$ S/cm) and therefore necessitate the use of very fine microporous films as the supports, to limit the electrolytic resistance of the rechargeable battery, which is proportional to the product of the thickness of the film and the reciprocal of the conductivity.

Accordingly, lithium rechargeable batteries using an electrolyte based on an organic solvent have relatively limited power performance.

To counter the drawbacks linked to the use of an electrolyte based on an organic solvent, some authors have considered replacing the organic solvent with water. The resulting electrolytes use aqueous solutions having a pH ranging from 6 to 10. The following drawbacks have been encountered in such prior art electrolytes:

- excessive release of hydrogen for these values of pH,
- the indispensable use of high-potential negative electrodes, and consequently a low generated voltage at the cell output.

There is therefore a real need for lithium batteries using aqueous electrolytes where there is a limited risk of serious release of hydrogen and it is possible to use negative electrodes of lower potential than conventionally used to increase the generated voltage at the cell output.

STATEMENT OF THE INVENTION

Accordingly, the invention relates to a lithium battery including a cell comprising:

- a positive electrode,
- a negative electrode, and
- an electrolyte consisting of an aqueous solution of a lithium salt disposed between said positive electrode and said negative electrode, characterized in that the electrolyte has a pH of at least 14, the positive electrode has a lithium intercalation potential greater than 3.4 V, and the negative electrode has a lithium intercalation potential less than 2.2 V.

Hereinabove and hereinafter, potentials are expressed relative to the reference pair $Li^+/Li$. This pair has an oxidation-reduction potential of $-3.02$ V relative to the normal hydrogen electrode (NHE).

Before commencing the more detailed description, the following definitions are given.

By positive electrode is meant the electrode that captures electrons and generates cations (here $Li^+$ cations) when the battery is discharging.

By negative electrode is meant the electrode that generates electrons and captures cations (here $Li^+$ cations) when the battery is discharging.

By lithium intercalation potential is meant the equilibrium thermodynamic potential of a material that comprises 50% lithium (here the material constituting the negative or positive electrode). This value is determined from a reference curve representing the potential V (expressed in volts) as a function of x (x representing the lithium intercalation ratio in the material), and the intercalation potential corresponds to the potential value on the curve for x=50%. FIG. 1 shows a curve of this type, the intercalation potential being symbolized on this curve by the symbol $P_i$.

The pH is measured in the conventional way using a pH-meter calibrated using commercial calibration solutions.

[2]By operating both on the pH of the electrolyte and on the nature of the electrodes, the inventors have obtained batteries having the following advantages:

- low release of hydrogen in operation, which limits the inherent risk of explosion to batteries releasing more hydrogen,
- a higher voltage (at least 1.2 V) delivered at the output of each cell as a result of the concomitant use of positive electrodes having a high lithium intercalation potential and negative electrodes having a lower lithium intercalation potential.

According to the invention, the positive electrode advantageously comprises a material chosen from lithium oxides with an olivine structure and the general formula $LiMPO_4$, where M is chosen from Fe, Mn, Ni and Co and mixtures thereof.

In particular, the positive electrode can comprise $LiFePO_4$, in which case the lithium intercalation potential is of the order of 3.45 V. Some of the iron atoms can be replaced by an element M' chosen from the transition metals, such as Mn, Ni or Co, in which case the positive electrode comprises a material of LiFeM' $PO_4$ type.

According to the invention, the negative electrode advantageously comprises a material chosen from lithium titanates, titanium oxide $TiO_2$ and mixtures thereof.

In particular, the negative electrode can comprise $Li_4Ti_5O_{12}$, the lithium intercalation potential of which is of the order of 1.55 V.

In addition to the materials constituting the positive and negative electrodes referred to above, the electrodes can further comprise carbon black, fibres and binders (cellulose polymers, elastomers).

The positive and negative electrodes can also comprise a current collector, for example of nickel, conventionally taking the form of a film on which the electrode is deposited.

Thus batteries of the invention can comprise, in each cell:
a positive electrode comprising $LiFePO_4$ and a negative electrode comprising $Li_4Ti_5O_{12}$, thereby generating at the cell output a voltage of 1.9 V, or
a positive electrode comprising $LiFePO_4$ and a negative electrode comprising $TiO_2$, thereby generating at the cell output a voltage of 1.85 V.

According to the invention, the electrolyte has a pH of at least 14, preferably greater than 15, and is the result of dissolving a lithium salt such as LiOH in water.

Apart from the dissolved lithium salt, the electrolyte can equally advantageously result from dissolving a strong base, such as NaOH and/or KOH, the electrolyte therefore further comprising a soda and/or potash solution. Adding strong bases of this type makes it easier to achieve pH values at least equal to 14, preferably greater than 15.

Operating at such pH values significantly reduces the hydrogen release potential (evaluated at 2.214 V for a pH value of 14) relative to prior art implementations operating at pH values ranging from 6 to 10 (producing hydrogen release potential values of 2.686 V and 2.55 V, respectively). Accordingly, there being less release of hydrogen, the risks inherent to the release of this gas are greatly reduced.

Thanks also to the reduced hydrogen release potential, it is possible to use negative electrodes having a lower intercalation potential than those of the prior art and thus to generate a higher voltage at the cell output.

The liquid electrolyte is advantageously supported by a polymer film, in particular a polyolefin film, such as a polyethylene or polypropylene film.

Lithium batteries of the invention can be prepared in the conventional way by a method comprising the following steps:
producing a stack comprising a positive electrode, a separator and a negative electrode, the positive electrode and the negative electrode conforming to the definitions given above,
impregnating said separator with a liquid electrolyte as defined above.

The invention is described next in relation to the following illustrative and nonlimiting example.

DETAILED DESCRIPTION OF PARTICULAR EMBODIMENTS

Example

This example illustrates the preparation of a lithium battery comprising:
a positive electrode comprising $LiFePO_4$,
a negative electrode comprising $Li_4Ti_5O_{12}$,
a liquid electrolyte consisting of a 4M aqueous solution of LiOH.

The preparation referred to above comprises:
a) preparing the electrodes,
b) preparing the liquid electrolyte,
c) producing the stack to generate a positive electrode/electrolyte/negative electrode stack.

a) Preparing the Electrodes

The reagents for preparing the electrodes are:
$LiFePO_4$ powder for the positive electrode and $Li_4Ti_5O_{12}$ powder for the negative electrode,
Super P carbon black powder (from Timcal),
fibres (from Toho Tenax GmbH),
a 2% solution of CMC (carboxymethyl cellulose, from Aldrich),
a 41% solution of NBR (nitrile-butadiene rubber, from PolymerLatex GmbH),
said reagents being present in the respective proportions by mass as follows: 92%, 2%, 2%, 2% and 2%.

The protocol is as follows and the same for the positive electrode and the negative electrode:
weighing the powders and the fibres followed by mixing the combination with a spatula,
weighing and adding the 2% CMC solution, mixing with a spatula followed by agitation by means of a disperser for approximately 20 to 30 minutes,
weighing and adding the 41% NBR solution followed by agitation by means of a disperser for 1 to 2 minutes,
coating a microperforated nickel film with the resulting mixture.

b) Preparing the Electrolyte

The solution prepared is a 4M lithine solution.

167.84 g of LiOH is dissolved in 1 l of distilled water in a graduated flask, dissolution being facilitated by magnetic agitation.

The pH of the solution is greater than 14.

c) Producing the Stack

The rechargeable battery is produced by stacking the positive electrode, a separator and the negative electrode, the separator being of Viledon® based on polypropylene fibres (from Freudenberg).

The resulting assembly is then vacuum impregnated with the electrolyte prepared beforehand.

The rechargeable battery is electrically tested on an Arbin type cycling bench.

Figure 1:
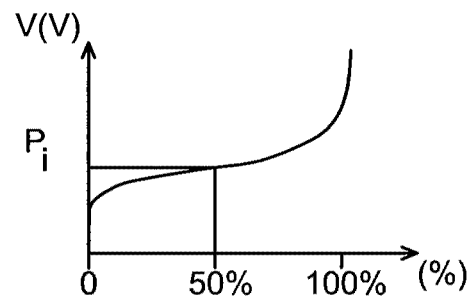
FIG. 1 shows a typical curve representing the potential V (in volts) of a material as a function of the lithium intercalation ratio x (in %) in said material, the point $P_i$ representing the lithium intercalation potential in said material (for x=50%).
Figure 2:
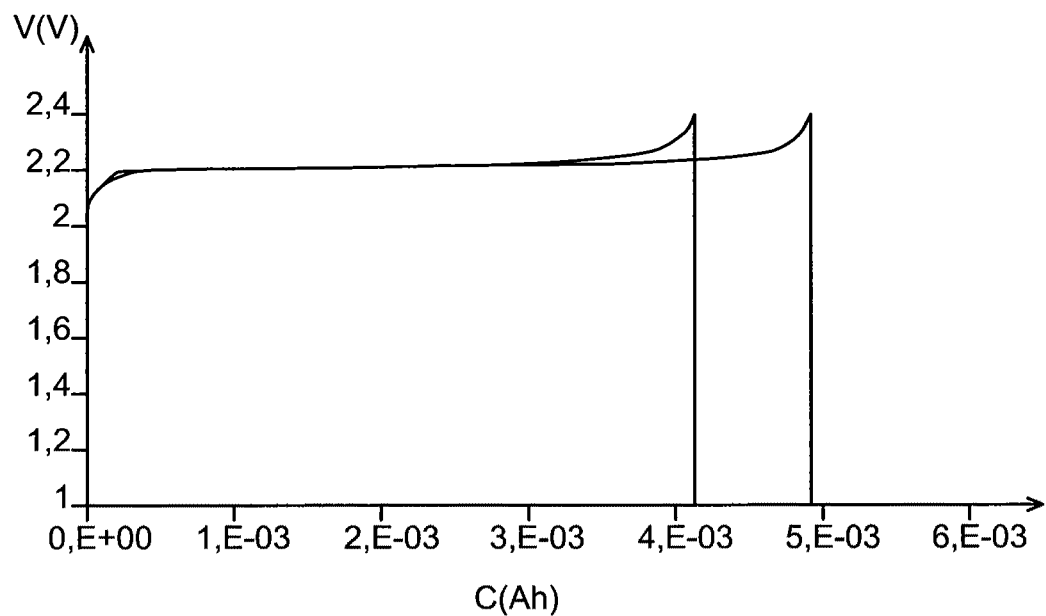
FIG. 2 shows constant current (1 mA) charging curves for the first two cycles of charging the rechargeable battery prepared as in the following example.

FIG. 2 shows the curves for the first two cycles of charging the rechargeable battery at constant current (1 mA), the stopping voltage being 2.4 V.

At the end of the second cycle, the charged capacity is 5 mAh, which corresponds to more than 60% of the theoretical nominal capacity of the rechargeable battery.

The invention claimed is:
1. Lithium battery including a cell comprising:
a positive electrode,
a negative electrode, and
an electrolyte comprising an aqueous solution of a lithium salt, wherein the electrolyte has a pH of at least 14, the positive electrode has a lithium intercalation potential greater than 3.4 V, and the negative electrode has a lithium intercalation potential less than 2.2 V;

wherein said positive electrode comprises a material selected from lithium oxides having an olivine structure of the general formula $LiMPO_4$, where M is selected from the group consisting of Fe, Mn, Ni, Co, and mixtures thereof; and wherein said negative electrode comprises a material selected from the group consisting of lithium titanates, titanium oxide $TiO_2$ and mixtures thereof.

2. The battery of claim 1, wherein the positive electrode comprises $LiFePO_4$.

3. The battery of claim 1, wherein the negative electrode comprises $Li_4Ti_5O_{12}$.

4. The battery of claim 1, comprising:
a positive electrode comprising $LiFePO_4$ and a negative electrode comprising $Li_4Ti_5O_{12}$, or
a positive electrode comprising $LiFePO_4$ and a negative electrode comprising $TiO_2$.

5. The battery of claim 1, wherein the lithium salt is LiOH.

6. The battery of claim 1, wherein the electrolyte further comprises an aqueous soda and/or potash solution.

7. The battery of claim 1, wherein the electrolyte is supported by a polymer film.

8. The battery of claim 7, wherein the polymer film comprises polyolefin.

* * * * *